C. F. SMITH.
Sod Cutter and Root Digger.
No. 54,030. Patented Apr. 17, 1866.
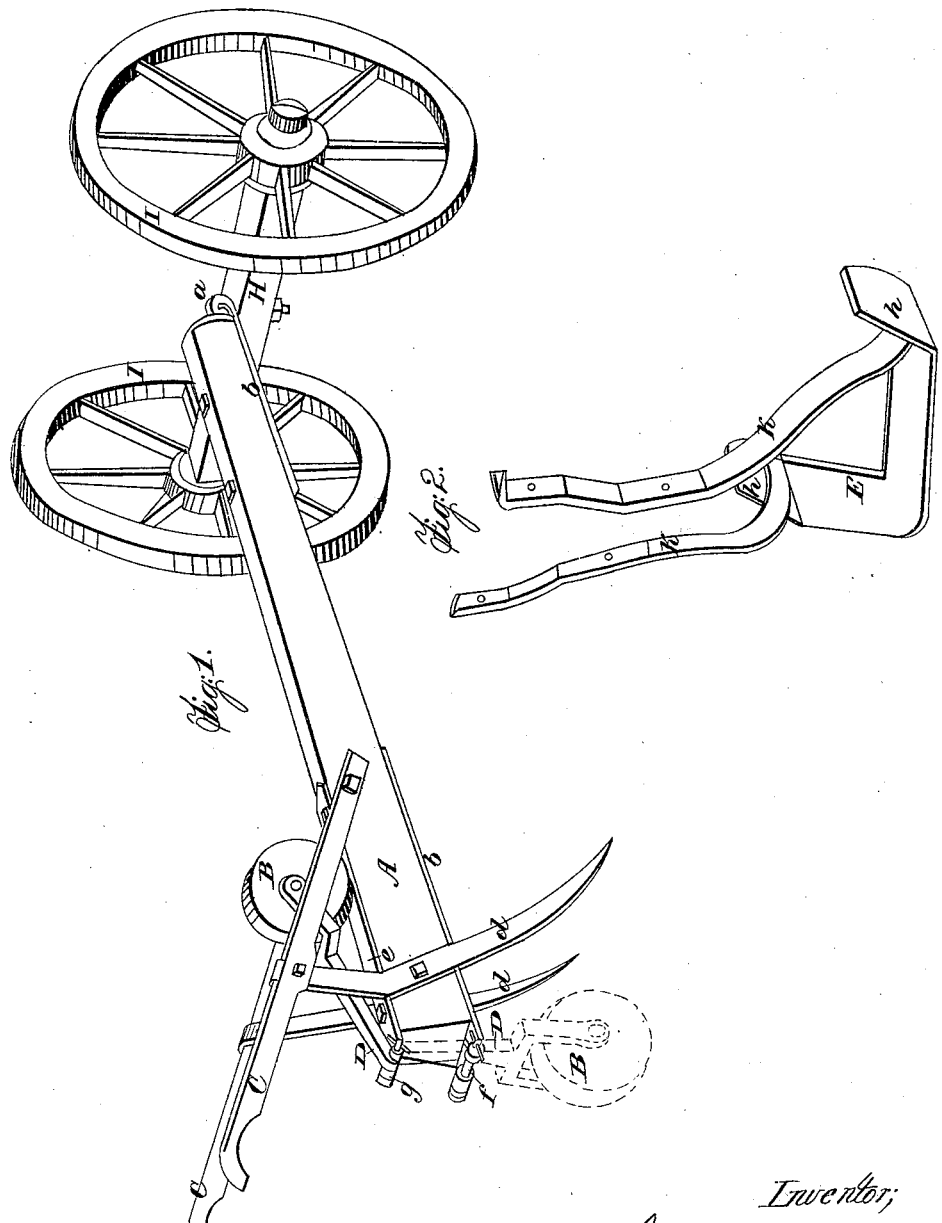

UNITED STATES PATENT OFFICE.

CHESTER F. SMITH, OF LITCHFIELD, CONNECTICUT.

IMPROVEMENT IN STONE AND ROOT DIGGERS.

Specification forming part of Letters Patent No. 54,030, dated April 17, 1866.

*To all whom it may concern:*

Be it known that I, CHESTER F. SMITH, of the town and county of Litchfield, in the State of Connecticut, have invented certain new and useful Improvements in Stone and Root Diggers and a Combined Bog-Cutter for Preparing Meadow-Land for the Mowing-Machine; and the following is a clear, full, and exact description of the same, reference being had to the accompanying drawings, making a part of this specification, in which—

Figure 1 represents a perspective view of my stone and root digger as it is limbered to the axle of an ox or horse cart for use. Fig. 2 shows a detached view of the bog-cutter, to be attached to the same beam and handles, and operated in the same manner.

The object of my invention is to make a simple, efficient, and cheap combined apparatus for loosening up and taking out the surface stones and roots and paring off the bogs and little irregularities in meadow-land, so as to prepare it for the mowing-machine.

My invention consists in the construction of a short beam to be attached for working to a common ox or horse cart axle, and the manner of making and securing the prongs or diggers to the beam and handles, and the attachment of a rear roller to prevent the prongs from catching and tearing up the ground when not designed to dig stones or roots, and the manner of securing the roller to the beam so that it can be turned up and carried on the top between the handles or easily taken out and left at the entrance of the field.

My invention further consists in the construction of a bog-cutter and the mode of securing it to the same beam and handles and in the same place that the prongs or diggers are fastened, thus making in one an agricultural implement to perform the twofold purpose of a stone and root digger and a bog-cutter.

To enable others skilled in the art to make and use my invention, I will describe it in detail, referring to the drawings and to the letters marked thereon.

I make the beam A of tough white oak or of hickory, about four feet in length. At the forward end I attach an eyebolt, $a$, to a strap or bar of flat iron, $b$, placed on the under side of the beam A and bolted firmly to it. The plate $b$ may extend the whole length of the beam and help to form the supports for both the digger or cutter and the roller B when it is down, for the purpose of moving the implement to and from the field. The handles C C are made of tough wood in the form and secured to the beam by a bolt in the ordinary manner of fastening plow-handles. The prongs or stone and root diggers $d$ $d$ are made of heavy bars of flat iron and are pointed with tempered steel and but slightly bent or curved forward. They are secured to both sides of the beam A near the rear end by a bolt passing through them, they being also supported to take the strain by fitting into notches or recesses made in the straps or bars of iron $b$ on the under side and the strap or plate $e$ on the rear end of the top of the beam, which extends forward between the handles and is bolted to the beam. In the rear ends of the straps $b$ and $e$ are eyes in which the frame D is secured to hold the roller B, so that the roller, when let down and secured in its place by the pin $f$, lifts the prongs $d$ $d$ off the ground. When the implement is being used the roller may be turned over and rest upon the beam, it being snugly supported between the handles C C, which are securely braced to the beam A by being bolted at the top to the iron bars which form the diggers $d$ $d$.

If desirable, when the machine is at work in the field, the frame and roller can be taken off by taking out the pin $g$, and left at the entrance.

The bog-cutter E, as seen in Fig. 2, is made of broad flat steel in the form of a V or square, the ends projecting forward and are turned up at right angles, making lips $h$ $h$, to cut off or divide a bog or anything too broad for the space between the arms or braces $k$ $k$, to which the cutter E is secured in such an angle that it is parallel with the surface of the meadow, although the end of the beam is considerably elevated when limbered to the cart-axle for use. The arms or braces $k$ $k$ are made to fit into the same places on the beam A and in the straps $b$ and $e$ as the prongs or diggers $d$ $d$, and are secured to the beam and handles by the same bolts, so that it takes but a few minutes to change from the one to the other, and in each case you have a perfect implement for the purpose it is designed for, the beam of my implement being so short, and by attaching it to a cart-axle, H, with the common-sized wheels I I, as seen in Fig. 1, the prongs, although being nearly straight, are brought in the right position to take hold of and lift out surface stones or roots, and the handles being low they are easily managed and have no tendency to throw about and injure the holder, nor do they wrench or strain the team like implements for such purposes hitched by a pole or tongue to the neck-yoke.

It has become an established fact that agriculture, as well as the mechanic arts, has got to be carried on by labor-saving implements and machines, and in various sections of the country the surface of the earth has got to be prepared by some process for the use of such implements, and as labor is being regarded justly as the source from which capital is derived, the old process of manual labor with the crowbar, digging up the small bowlders, has become irksome, and the swinging of the scythe in stony and bog meadows will not pay. Thus it will be seen that my invention is much needed.

Having thus fully described my invention, what I claim as new, and desire to secure by Letters Patent, is—

The short beam A, roller-frame D, and roller B, as constructed and operating in the manner described, in combination with the prongs $d\ d$, which support and brace the handles C C on the bog-cutter E, and braces $k\ k$, substantially as and for the purposes herein set forth.

Subscribed to on this 17th day of February, 1866.

CHESTER F. SMITH.

Witnesses:
GEO. M. WOODRUFF,
GEO. C. WOODRUFF.